United States Patent Office 2,744,074
Patented May 1, 1956

2,744,074

POLYMERIC ORGANIC ALUMINUM OXIDES AND METHOD FOR PREPARING SAME

Clement W. Theobald, Wilmington, Del., assignor to E. I. du Pont de Nemours and Company, Wilmington, Del., a corporation of Delaware No Drawing. Application April 18, 1951, Serial No. 221,750

11 Claims. (Cl. 260—2)

This invention relates to new organic polymeric aluminum compounds and to novel methods for effecting their preparation.

More particularly, the invention relates to novel organic polymeric aluminum monoxides and their preparation by reacting under controlled conditions an aluminum alkoxide and an anhydrous carboxylic acid and then subjecting the isolated reaction product to polymerization condensation.

It is among the objects of this invention to provide new polymeric aluminum compounds and novel methods for their preparation. A particular object is to provide highly useful, readily adaptable methods for preparing high-molecular-weight polymeric aluminum compounds having unique solubility characteristics in various types of organo, especially hydrocarbon, solvents, and their solutions exhibiting novel surface characteristics and therefore adaptable to a wide variety of commercial applications. Further objects and advantages of the invention will be evident from its ensuing description.

In accordance with this invention, there are provided new organic polymeric monoxides having degrees of polymerization of at least 16 and containing a lateral substituent group of the class of alkoxy- and acyloxy, the aluminum in said polymers being part of the main polymer chain and the alkoxy and acyloxy group being joined directly to aluminum. These compounds correspond structurally to

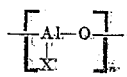

wherein X is alkoxy or acyloxy and $n$ is a whole number of at least 16.

The organic polymeric aluminum compounds of this invention are generally obtained by reacting, under anhydrous conditions, an aluminum alkoxide of the formula $Al(OR)_3$, where R is an alkyl group containing from 1 to 18 carbon atoms, in the presence or absence of an organic solvent, with at least one molar equivalent of an anhydrous carboxylic acid, and then effecting a condensation polymerization reaction by heating the product under vacuum until removal of volatile materials ceases. The residue comprises the desired substituted polymeric aluminum monoxide and will vary in physical appearance from a grease to a transparent, hard, resinous mass, depending upon its composition.

In one specific preferred adaptation of the invention, my novel organic polymeric aluminum compounds are obtained by mixing a suitable aluminum alkoxide, such as aluminum isopropoxide, with an anhydrous aliphatic monocarboxylic acid, such as stearic acid, in a ratio of from 1:2 mols of acid per mol of the aluminum alkoxide. Reaction therebetween is then preferably effected by heating in a suitable reaction vessel to between about 50° C. and 112° C. while distilling off the isopropanol or other alcohol formed in the reaction, advantageously as an azeotrope with a suitable hydrocarbon such as n-heptane, benzene, or toluene. The residue is then subjected to condensation polymerization by vacuum distillation at from about 120° C. to 350° C. to remove isopropyl stearate or other ester present, and any other volatile reaction products. After volatile reaction products cease to come off, the distillation is stopped and the polymeric product is recovered by removing it from the distillation vessel through extraction with a suitable solvent or as otherwise desired.

The polymeric aluminum compounds of organic acids containing more than 6 carbon atoms resulting from this invention are unique in that they are readily soluble in organic solvents, especially those of the non-oxygenated type, such as chloroform, benzene, toluene, alphachloronaphthalene, cetane, carbon tetrachloride, petroleum ether, etc., and the resulting solutions exhibit novel and highly desirable surface-active properties.

To a clearer understanding of the invention, the following specific examples are given, wherein parts indicated are by weight. These examples merely illustrate and are not to be construed as limiting the scope of my invention:

Example I

Aluminum isopropoxide was distilled directly into a tubular-shaped reactor which had previously been tared. The center cut from this distillation which boiled at 142–144° C./23 mm. weighed 135.1 g. After flushing with nitrogen, the reactor was transferred to the receiver of a second still and 600 cc. of dry toluene was added by distillation. The reactor was fitted with a take-off condenser, dropping funnel, and stirrer and suspended in a bath of boiling toluene. To this hot toluene solution there were added dropwise, while stirring under nitrogen, 172.3 g. of heptanoic acid. The solution became very viscous during the addition of the heptanoic acid, and the toluene/isopropyl alcohol azeotrope was distilled off. The solvent was removed at reduced pressure and collected in a Dry-Ice-cooled trap. Distillation of the combined low temperature volatiles gave an azeotrope fraction containing 66.6 g. of isopropyl alcohol. When all of the solvent had been removed, the dry isopropoxyaluminum diheptanoate was heated at 216° C. (boiling nitrobenzene vapor bath) under 1 mm. pressure for 48 hours. There was obtained 113.4 g. of a light-yellow, brittle, polymeric material which was soluble in toluene and other organic solvents of the type above referred to; and exhibited a bluish-white fluorescence, both in the dry state and in solution in heptane and in toluene at 2 g. per 100 cc. concentration. Determination of the molecular weight by the method of boiling point elevation gave a value of 5,730 (DP=33) for the product, and on analysis its molecular formula was determined to be $C_7H_{13}AlO_3$, having the percentage compositions:

| | | |
|---|---|---|
| C | 47.27, | 47.37 |
| H | 7.84, | 7.83 |
| Al | 16.59, | 16.46 |
| $OC_3H_7$ | | Nil |

The distillate obtained during the polymerization reaction was redistilled and found to consist entirely of 89.83 g. of isopropyl heptanoate which boiled at 71–73° C./8 mm., and had an index of $n_D^{25}$ 1.4100. An additional small quantity of isopropyl heptanoate was obtained by distillation of the toluene fraction to obtain a total of 100.62 g.

Example II

A solution of 20.4 g. of aluminum isopropoxide in 343.6 g. dioxane (5.88%) was prepared in an atmosphere of dry nitrogen to avoid hydrolysis. To this solution there was added, dropwise, a 26.00 g. portion of heptanoic acid over a period of 30 minutes. A mildly exothermic reaction took place that caused precipitation of a white solid. The precipitated solid was filtered under nitrogen, washed with dry dioxane and dried in a vacuum oven at 70° C. for 16 hours. It weighed 21.10 g. An additional 7.11 g. of material remained that did not rinse easily from the reactor. Upon analysis this salt was shown to have the composition $$Al[OCH(CH_3)_2]_{0.80}(OCOC_6H_{13})_{1.68}(OH)_{0.51}$$

A portion of this salt was heated to 287° C. for 2 hours under high vacuum. The material melted and bubbles escaped vigorously from the melt which became increasingly viscous and finally set to a rigid transparent plug. The distillate was identified as isopropyl heptanoate. The residual hard brittle glass was soluble in toluene and other aromatic hydrocarbons, but was insoluble in alcohol, acetone, dioxane. Determination of the molecular weight by the method of boiling point elevation in toluene gave values of 5600, 5800. This molecular weight, which corresponds to a degree of polymerization of 33, was attained in a shorter length of time than the polymer of Example I by the use of a higher polymerization temperature (287° C. vs. 216° C.).

*Example III*

Isopropoxyaluminum distearate was prepared in toluene as described in Example I from 20.4 grams of aluminum isopropoxide and 56.8 grams of stearic acid. The salt was isolated by removal of the solvent at reduced pressure to leave a waxy residue. This residue, which melted at 250° C. to give a fluid amber melt, was maintained at 300–315° C. under vacuum for ½ hour. A distillate identified as isopropyl stearate was obtained. The residue consisted of a beeswax-like solid that was soluble in toluene, and chlorinated hydrocarbon solvents, but was insoluble in acetone, methyl ethyl ketone, acetonitrile, tetramethylenesulfone, methyl cellosolve, isobutyl alcohol, dioxane, and cellosolve acetate. As in the instance of Example I, the polymeric product showed a bluish-white fluorescence, both in the dry state and in solution in heptane and in toluene at 2 g. per 100 cc. concentration.

The molecular weight determination on the polymeric product (by the method of boiling point elevation in benzene) gave values of 3100, 3100. On analysis its molecular formula was $C_{18}H_{35}AlO_3$, in the percentage composition:

C _____ 65.53
H _____ 11.13
Al _____ 8.38

Further heating of the polymeric product at 306° C. for 2.5 hours increased its molecular weight to 5600, a degree of polymerization of 16.

*Example IV*

A solution of 61.2 grams of aluminum isopropoxide in 300 grams of toluene was distilled to remove traces of water. To this solution there was then added 26.4 grams of butyric acid. An azeotrope of toluene/isopropyl alcohol (33.9 grams) was removed by distillation. The resulting toluene solution was a clear, light-yellow, non-viscous liquid. Solid diisopropoxyaluminum monobutyrate was isolated by precipitation in acetone and filtered. After drying in a vacuum oven at 70° C., a 19.95 gram fraction was heated under vacuum in a distilling apparatus. No visible changes occurred in the solid until the bath temperature reached approximately 200° C. at 49 mm. At this temperature the solid began to shrink in volume and a liquid slowly distilled over. Heating was continued to a final bath temperature of 315° C., at which time no more liquid distillate appeared.

The distillate had an ester-like odor which when purified by distillation was identified by analysis as isopropyl butyrate. The unchanged solid consisting of 9.41 grams had on analysis the formula $C_3H_7AlO_2$ and the following percentage compositions:

C _____ 31.27, 31.16
H _____ 5.21, 5.07
Al _____ 26.57, 26.43

*Example V*

A solution of 20.4 grams of aluminum isopropoxide in 200 grams dioxane was prepared in an atmosphere of nitrogen. To this solution there was added 17.6 grams of butyric acid in 50 cc. dioxane, and the reaction mixture was heated to reflux. Solid material separated from the hot reaction mixture and more solid separated as the reaction mixture was cooled. This solid was filtered under nitrogen and dried in a vacuum oven at 70° C. to yield 6.65 grams of isopropoxyaluminum dibutyrate. Heat treatment of this solid at 200–315° C. and until removal of volatile products ceased, yielded 4.25 parts of a polymeric aluminum butyrate analyzed $C_4H_7AlO_3$ having the percentage compositions:

C _____ 39.97, 39.86
H _____ 6.12, 6.18
Al _____ 17.56, 17.56

*Example VI*

Dimyristoxyaluminum acetate was prepared as described in Example I using 22.37 grams of undistilled aluminum myristoxide and 1.80 grams of acetic acid. After removal of the toluene at reduced pressure, the waxy residue (23.95 grams) was heated at 255° C. for one hour and forty minutes. The myristyl acetate that distilled out during this time was found to boil at 162° C./11 mm. A soluble low melting wax-like resin (8.11 grams) remained in the reactor. On analysis this product was found to have the percentage composition:

C _____ 63.60, 63.47
H _____ 11.05, 11.07
Al _____ 10.70, 10.83

*Example VII*

Isopropoxyaluminum dibenzoate was prepared by the method of Example I from 142.8 grams of aluminum isopropoxide and 170.8 grams of benzoic acid. The salt which still contained residual toluene was heated under vacuum at 300–325° C. for 11 hours from which a yield of 126.5 grams of polymeric aluminum benzoate was obtained. The distillate from this heat treatment was identified as isopropyl benzoate by composition, physical properties, and saponification number. The residue, a light-yellow, amorphous solid, did not melt before burning and was insoluble in the common organic solvents. Its percentage composition was:

C _____ 54.05
H _____ 3.61
Al _____ 14.03

Although described and illustrated as applied to certain specific embodiments, the invention is not to be considered as restricted thereto.

Although the exact structure of the organic aluminum compounds of this invention is not presently definitely known to me, they are characterized by having an aluminum-oxygen-aluminum polymer chain with lateral carbalkoxy or alkoxy groups attached to the aluminum atoms, i. e.,

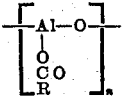

or

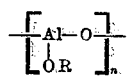

R being an alkyl and $n$ a whole number of 16 or greater. It has been ascertained, however, that their composition depends upon the ratio of aluminum alkoxide to aliphatic carboxylic acid employed in their preparation. Thus, the products obtained from equimolar mixtures of aluminum alkoxide and acid contain alkoxide groups attached directly to aluminum and are essentially free of acyloxy groups. On the other hand, the products from one mol of aluminum alkoxide and two mols of aliphatic carboxylic acid contain acyloxy groups attached to aluminum and are essentially free of alkoxide groups. Irrespective of the ratio of reactants employed, they contain no water of hydration. The term "organic aluminum compound" as used herein refers to the non-volatile products obtained by the vacuum treatment of compounds formed by the reaction of an aluminum alkoxide with a carboxylic acid in 1:1 or 1:2 mol ratios until volatile materials cease to come off.

In place of the specific aluminum alkoxides of the examples employed in preparing my novel compounds, there can be used other aluminum alkoxides, such as aluminum methyl oxide, aluminum ethyl oxide, aluminum butyl oxide, aluminum pentyl oxide, aluminum hexyl oxide, aluminum heptyl oxide, aluminum octyl oxide, aluminum dodecyl oxide, aluminum octadecyl oxide, etc. Similarly, any anhydrous carboxylic acid can be used, although the preferred acids, due to their availability and reactivity, comprise the aliphatic monocarboxylic acids containing from 1 to 21 carbon atoms. Examples of such utilizable acids include acetic, propionic, butyric, valeric, caprylic, heptylic, lauric, myristic, stearic, palmitic, margaric, arachidic, oleic, linoleic, beta-eleostearic, acids derived from semidrying and drying oils, benzoic acid, phenylacetic acid, hexahydrobenzoic acid, quinolinic acid, pyridine carboxylic acid, furoic acid, etc.

Although reaction between the aluminum alkoxide and aliphatic monocarboxylic acid will occur even at substantially room temperature (20° C.) because of the better rate of reaction, I prefer to conduct the reaction at from about 50° C. to 112° C. The material obtained by reaction at 50° C. to 112° C. is isolated by removal of solvent or by drawning in a non-solvent, and is then subjected to heat-treatment under a suitable vacuum. The particular temperature employed in the distillation depends upon the nature of the acyloxy group involved. As a rule, satisfactory results are obtained with temperatures in the range of from about 120° C. to 350° C. Hence, the distillation is generally conducted at temperatures in that range.

If desired, the reaction between the aluminum alkoxide and the acid can be conducted as already noted in the presence of organic solvents. Utilizable solvents for this purpose include benzene, toluene, xylene, cyclohexane, and the like. The concentration of the solution employed is determined entirely by the limits of solubility of the reactants. The condensation polymerization reaction can be carried out, if desired, in high boiling solvents, such as biphenyl, naphthalene, decahydronaphthalene, etc., or, if preferred, without any solvent being present, as by heating the dry alkoxyaluminum acylates.

The polymeric aluminum organic compounds of this invention find utility as dispersing agents for white or colored organic or inorganic type pigments, and in other applications where surface activity is a prime requisite. In addition to this use, they are useful as lead scavengers in gasoline, rust inhibitors, lubricating oil additives, pour point depressants for lubricating oils, cross-linking agents for polymers, as components of various coating compositions, including paints, enamels, lacquers, etc., and as anti-perspirants, etc.

I claim as my invention:

1. A method for preparing an organic polymeric aluminum compound which comprises reacting an aluminum alkoxide having the formula Al(OR)₃ wherein R is an alkyl group containing from 1 to 18 carbon atoms, with an anhydrous carboxylic acid, employing in the reaction at least one molar equivalent of acid per mol of alkoxide, isolating the resulting reaction product and subjecting it to condensation polymerization by heating to a temperature ranging from about 120° C.–350° C. under vacuum until removal of volatile products ceases.

2. A method for producing an organic polymeric aluminum monoxide having a degree of polymerization of at least 16 which comprises reacting under anhydrous conditions an aluminum alkoxide of the formula Al(OR)₃ in which R is an alkyl group containing from 1–18 carbon atoms, with at least one molar equivalent of an anhydrous aliphatic monocarboxylic acid containing from 1–21 carbon atoms, isolating the resulting product and subjecting it to a condensation polymerization reaction by heating to temperatures ranging from 120° C.–350° C. under vacuum until the removal of volatile products ceases.

3. A method for preparing an organic polymeric aluminum monoxide having a degree of polymerization of at least 16 which comprises reacting under anhydrous conditions an aluminum alkoxide of the formula Al(OR)₃ in which R is an alkyl group containing from 1–18 carbon atoms, with an anhydrous aliphatic monocarboxylic acid in a ratio of from 1 to 2 mols of acid per mol of aluminum alkoxide, effecting said reaction at temperatures ranging from about 50–112° C. while removing volatile products of reaction, subjecting the residue to condensation polymerization by vacuum distillation at from about 120–350° C., and recovering the resulting polymeric product.

4. A method for preparing an organic polymeric aluminum compound comprising mixing aluminum isopropoxide with anhydrous stearic acid in a ratio of from 1 to 2 mols of acid per mol of aluminum isopropoxide, reacting the mixture by heating to between 50 and 112° C., subjecting the resulting residual reaction product to condensation polymerization at temperatures ranging from 120° C.–350° C. under vacuum and recovering the polymeric product from the vacuum distillation vessel.

5. A method for producing an organic polymeric aluminum monoxide which comprises reacting aluminum isopropoxide in the presence of an organic solvent with anhydrous stearic acid, employing in the reaction from 1 to 2 mols of acid per mol of aluminum isopropoxide, effecting said reaction at a temperature between 50 and 112° C. while distilling off isopropanol formed in the reaction, subjecting the residual reaction product to condensation polymerization by vacuum distillation at from about 120–350° C. to remove by-product isopropyl stearate formed, and thereafter recovering the polymeric product from the distillation vessel.

6. A method for preparing an organic polymeric aluminum compound comprising reacting at from about 50–112° C. aluminum isopropoxide with anhydrous heptanoic acid in a ratio of from 1–2 mols of acid per mol of aluminum isopropoxide, subjecting the resulting reaction product to condensation polymerization by vacuum distillation at temperatures ranging from 120° C.–350° C. until volatile reaction products are removed therefrom, and then recovering the resulting organic polymeric aluminum compound.

7. A method for preparing an organic polymeric aluminum compound comprising reacting at from about 50–112° C. aluminum isopropoxide with anhydrous butyric acid in a ratio of from 1–2 mols of acid per mol of aluminum isopropoxide, subjecting the resulting reaction product to condensation polymerization by vacuum distillation at temperatures ranging from 120° C.–350° C. until volatile reaction products are removed therefrom, and then recovering the resulting organic polymeric aluminum compound.

8. An organic polymeric aluminum monoxide having an acyl:aluminum ratio of 1:1 and a degree of polymerization of at least 16, comprising the condensation polymerization reaction product of an isolated precipitate obtained from the reaction of aluminum isopropoxide with about 2 mols of stearic acid per mol of said isopropoxide followed by vacuum distillation at temperatures ranging from about 120° C.–350° C. until removal of volatile products ceases.

9. An organic polymeric aluminum monoxide having an acyl:aluminum ratio of 1:1 and a degree of polymerization of at least 16, comprising the condensation polymerization reaction product of an isolated precipitate obtained from the reaction of aluminum isopropoxide with about 2 mols of heptanoic acid per mol of said isopropoxide followed by vacuum distillation at a temperature between 120° C.–350° C. until removal of volatile product has been effected.

10. An organic polymeric aluminum monoxide having an acyl:aluminum ratio of 1:1 and a degree of polymerization of at least 16, comprising the condensation polymerization reaction product of an isolated precipitate obtained from the reaction of aluminum isopropoxide with about 2 mols of butyric acid per mol of said isopropoxide followed by vacuum distillation at temperatures ranging from about 120° C.–350° C. until removal of volatile products ceases.

11. An organic polymeric aluminum monoxide having an acyl:aluminum ratio of 1:1 and a degree of polymerization of at least 16, comprising the condensation polymerization reaction product of an isolated precipitate obtained from the reaction of aluminum isopropoxide with about 2 mols of an anhydrous aliphatic monocarboxylic acid per mol of said isopropoxide, followed by heating of the reaction product under vacuum and at temperatures ranging from about 120–350° C. until removal of volatile products ceases.

References Cited in the file of this patent

Gray et al.: J. Phys. and Colloid Chem., vol. 53, 1949, pages 30–39.

Eigenberger: Felte und Seifen, vol. 49, July 1942, pages 505–508.

Henle: Berichte der Deut. Chem. Gesel., vol 53 (1920), pages 719–721.

Gray et al.: J. Phys. and Colloid Chem., vol. 53, 1949, pages 23–29.

Meerwein et al.: Liebig's Annalen der Chemie, vol. 476, 1929, pages 132 and 133.

Child et al.: Journal American Chemical Soc., vol. 45, 1923, pages 3013 and 3014.

Parry et al.: Transactions of the Faraday Society, vol. 46, part 4, April 1950, pages 305–310.